US011765656B2

(12) United States Patent
Foukas et al.

(10) Patent No.: US 11,765,656 B2
(45) Date of Patent: Sep. 19, 2023

(54) ADJUSTING DISCONTINUOUS RECEPTION BEHAVIOR OF A USER EQUIPMENT TO CONSERVE ENERGY USE

(71) Applicant: Microsoft Technology Licensing, LLC, Redmond, WA (US)

(72) Inventors: Xenofon Foukas, Cambridge (GB); Bozidar Radunovic, Cambridge (GB); Yongguang Zhang, Redmond, WA (US); Landon Prentice Cox, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/100,883

(22) Filed: Jan. 24, 2023

(65) Prior Publication Data

US 2023/0171694 A1  Jun. 1, 2023

Related U.S. Application Data

(63) Continuation of application No. 17/348,390, filed on Jun. 15, 2021, now Pat. No. 11,601,882.

(51) Int. Cl.
*H04W 52/02* (2009.01)
*H04W 76/28* (2018.01)

(52) U.S. Cl.
CPC ... *H04W 52/0216* (2013.01); *H04W 52/0235* (2013.01); *H04W 76/28* (2018.02)

(58) Field of Classification Search
CPC ......... H04W 52/0216; H04W 52/0235; H04W 76/28
See application file for complete search history.

(56) References Cited

U.S. PATENT DOCUMENTS

2015/0038154 A1* 2/2015 Ponukumati ...... H04W 52/0238
455/552.1
2020/0100080 A1* 3/2020 Mladin ................. H04W 12/35

FOREIGN PATENT DOCUMENTS

WO  WO-2017148214 A1 * 9/2017  ............ H04W 56/00

* cited by examiner

*Primary Examiner* — Ayanah S George
(74) *Attorney, Agent, or Firm* — RAY QUINNEY & NEBEKER P.C; James Bullough

(57) ABSTRACT

A method for adjusting discontinuous reception (DRX) behavior of a user equipment (UE) to conserve energy use includes exposing a DRX application programming interface (API) that enables DRX parameters to be changed and defining a conflict resolution policy that controls when requests to change the DRX parameters should be granted. The method also includes receiving, via the DRX API, a request from an application to change a DRX parameter for the UE. The UE is in wireless communication with a base station, and the application is configured to send data to the UE via a mobile network that comprises the base station. The method also includes determining, based at least in part on the conflict resolution policy, that the request should be granted and sending a command to the base station that causes the base station to communicate a new value of the DRX parameter to the UE.

20 Claims, 12 Drawing Sheets

ADJUSTING DISCONTINUOUS RECEPTION BEHAVIOR OF A USER EQUIPMENT TO CONSERVE ENERGY USE

CROSS-REFERENCE TO RELATED APPLICATIONS

This application is a Continuation of U.S. application Ser. No. 17/348,390, filed on Jun. 15, 2021, the entirety of which is incorporated herein by reference.

BACKGROUND

Mobile telecommunications networks are widely deployed to provide various communication services such as voice, text messaging, multimedia data, Internet connectivity, and the like. Mobile telecommunications networks can be multiple-access networks capable of supporting multiple users by sharing the available network resources. Mobile telecommunications networks may be referred to herein simply as mobile networks.

There are many different types of mobile devices that can be used in connection with a mobile network. Mobile devices have traditionally included smartphones, tablet computers, and laptop computers, but will increasingly include cars, drones, industrial and agricultural machines, robots, home appliances, medical devices, and so on. In the context of mobile networks, mobile devices are often referred to as user equipment (UE).

A mobile network is distributed over geographical areas that are typically referred to as "cells." Each cell can be served by at least one base station. One or more base stations provide a cell with network coverage, which can be used for transmission of voice, data, and other types of content. When joined together, these cells provide radio coverage over a wide geographic area. In addition, a mobile network is typically connected to the Internet. Thus, a mobile network enables a mobile device to communicate with other mobile devices within the mobile network, as well as other computing devices that are connected to the Internet.

Mobile networks have undergone significant changes over the past several decades. The first two generations of mobile networks supported voice and then text messaging. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

The Third Generation Partnership Project (3GPP) is a consortium of a number of standards organizations that develop protocols for mobile telecommunications. 3GPP is responsible for the development of Long-Term Evolution (LTE) and related 4G standards, including LTE Advanced and LTE Advanced Pro. 3GPP is also responsible for the development of 5G standards. 5G systems are already being deployed and are expected to become widespread in the near future.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

In accordance with one aspect of the present disclosure, a method for adjusting discontinuous reception (DRX) behavior of a user equipment (UE) to conserve energy use is disclosed. The UE is in wireless communication with a base station. The method is performed by a radio access network (RAN) controller that is communicatively coupled to the base station. The method includes exposing a DRX application programming interface (API) that enables DRX parameters to be changed. The method also includes creating a conflict resolution policy that controls when requests to change the DRX parameters should be granted. The conflict resolution policy is designed to prevent conflicts between different applications. The method also includes receiving, via the DRX API, a first request from a first application to change a DRX parameter for the UE from a current value to a new value. The first application is external to the UE and is configured to send data to the UE via a mobile network that comprises the base station. The method also includes determining, based at least in part on the conflict resolution policy, that the first request should be granted. The method also includes sending a command to the base station. The command causes the base station to communicate the new value of the DRX parameter to the UE.

The first application may send data packets to the UE at a packet interval. Changing the DRX parameter causes a duration of a DRX cycle for the UE to match the packet interval.

Receiving the first request from the first application may include receiving a function call to a function that is exposed by the DRX API.

The function call may include the new value for the DRX parameter.

The first application may send data packets to the UE at a packet interval. The function call may include the packet interval. The method may further include determining the new value for the DRX parameter based at least in part on the packet interval.

The conflict resolution policy may define a plurality of actions. Each action among the plurality of actions may represent modifying one or more of the DRX parameters associated with a particular UE. The conflict resolution policy may permit only a single owner for each action among the plurality of actions. Determining that the first request should be granted may be based at least in part on ownership of an action corresponding to the first request.

The first request may be received from a third-party application. Determining that the first request should be granted may include identifying an action corresponding to the first request and determining that the action is not owned by another third-party application.

Determining that the first request should be granted may further include determining that at least one additional condition is satisfied. The at least one additional condition may be unrelated to ownership of the action.

The method may further include receiving, via the DRX API, a second request from a second application to change the DRX parameter. The method may further include determining, based at least in part on the conflict resolution policy, that the second request should not be granted. The method may further include sending a response to the second application indicating that the second request is denied.

Determining that the second request should not be granted may include identifying an action corresponding to the second request and determining that the action is owned by the first application.

In accordance with another aspect of the present disclosure, a method for adjusting discontinuous reception (DRX) behavior of a user equipment (UE) to conserve energy use is disclosed. The UE is in wireless communication with a base station. The method is performed by an application that is sending data to the UE via a mobile network that includes the base station. The method includes sending data packets to the UE at a packet interval. The method also includes determining, based at least in part on the packet interval, that the DRX behavior of the UE should be changed. The method also includes causing a DRX parameter for the UE to be changed via a DRX application programming interface (API) exposed by a radio access network (RAN) controller that is communicatively coupled to the base station. Causing the DRX parameter to be changed includes sending a request to the RAN controller to change the DRX parameter. The request is sent via the DRX API. Causing the DRX parameter to be changed also includes providing the RAN controller, via the DRX API, with UE identifying information that enables the UE to be identified and parameter identifying information that enables a new value for the DRX parameter to be determined.

Sending the request to the RAN controller may include making a function call to a function that is exposed by the DRX API. The function call may include the UE identifying information and the parameter identifying information.

The parameter identifying information may include the new value for the DRX parameter.

The parameter identifying information may include the packet interval.

In accordance with another aspect of the present disclosure, a system is disclosed for adjusting discontinuous reception (DRX) behavior of a user equipment (UE) to conserve energy use. The UE is in wireless communication with a base station. The system includes, one or more processors, memory in electronic communication with the one or more processors, and instructions stored in the memory. The instructions are executable by the one or more processors to expose a DRX application programming interface (API) that enables DRX parameters to be changed. The instructions are executable by the one or more processors to create a conflict resolution policy that controls when requests to change the DRX parameters should be granted. The conflict resolution policy is designed to prevent conflicts between different applications. The instructions are executable by the one or more processors to receive, via the DRX API, a first request from a first application to change a DRX parameter for the UE from a current value to a new value. The first application is external to the UE and is configured to send data to the UE via a mobile network that comprises the base station. The instructions are executable by the one or more processors to determine, based at least in part on the conflict resolution policy, that the first request should be granted. The instructions are executable by the one or more processors to send a command to the base station. The command causes the base station to communicate the new value of the DRX parameter to the UE.

The first application may send data packets to the UE at a packet interval. Changing the DRX parameter may cause a duration of a DRX cycle for the UE to match the packet interval.

Receiving the first request from the first application may include receiving a function call to a function that is exposed by the DRX API.

The function call may include the new value for the DRX parameter.

The first application may send data packets to the UE at a packet interval. The function call may include the packet interval. The system may further include additional instructions stored in the memory. The additional instructions may be executable by the one or more processors to determine the new value for the DRX parameter based at least in part on the packet interval.

The conflict resolution policy may define a plurality of actions. Each action among the plurality of actions may represent modifying one or more of the DRX parameters associated with a particular UE. The conflict resolution policy may permit only a single owner for each action among the plurality of actions. Determining that the first request should be granted is based at least in part on ownership of an action corresponding to the first request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
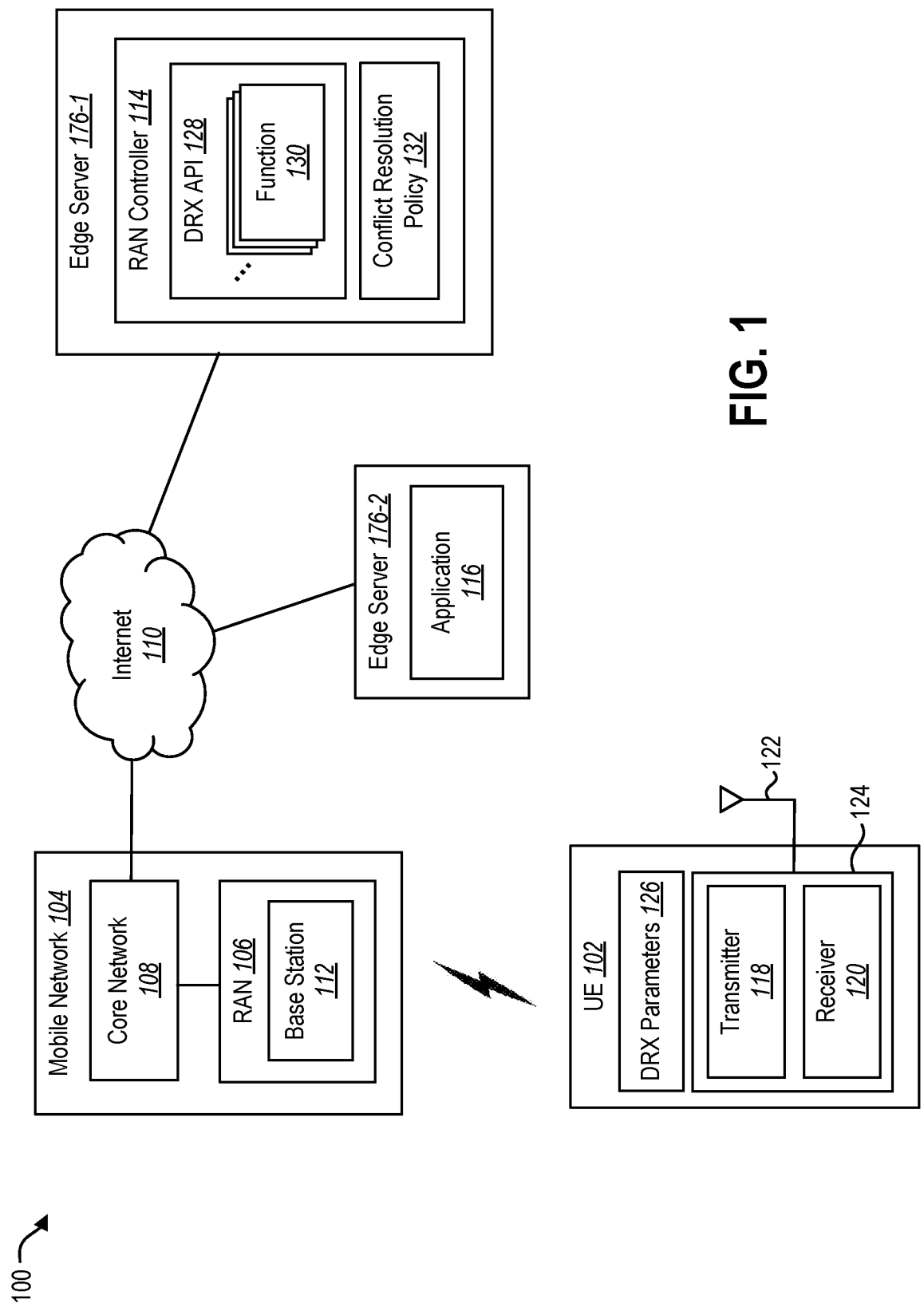
FIG. 1 illustrates an example of a system in which the techniques disclosed herein can be utilized.

To conserve energy as much as possible, it is desirable for a UE to keep its receiver circuitry turned off when it is not needed. Discontinuous reception (DRX) is a method that is employed in various wireless technologies to allow a UE to turn its receiver off during periods of inactivity. The UE and the network negotiate phases in which data transfer occurs. During other times the UE turns its receiver off and enters a low power state. With current approaches, a base station configures a UE with a set of DRX parameters that control the UE's DRX behavior.

The present disclosure is generally related to improved techniques for adjusting DRX behavior of a UE to conserve energy use. The techniques disclosed herein enable an application that is sending data to a UE via a mobile network to directly adjust the UE's DRX parameters. Directly adjusting a UE's DRX parameters in this way is not possible with current approaches.

For example, consider a scenario in which an application is sending data to a UE. Further suppose that the UE is wirelessly connected to the Internet via a mobile network, such that the UE is receiving the data via a base station. In this scenario, the frequency at which the application sends data to the UE can be known. For instance, a new data packet can be sent to the UE once every N milliseconds. To maximize energy savings in this situation, the DRX parameters for the UE can be selected so that the UE's DRX behavior is based on the frequency at which data is being sent to the UE. For example, the DRX parameters for the UE can be selected so that the UE turns its receiver circuitry on every N milliseconds to receive a new data packet. If the UE turns its receiver circuitry on more frequently than once every N milliseconds, then energy is likely being wasted (if, for example, the application is the only application that is sending data to the UE via the mobile network).

However, there is not currently a simple way to achieve this result. With known approaches it is not possible for an application that is sending data to a UE to directly adjust the UE's DRX parameters. As noted above, with known approaches a base station configures a UE with a set of DRX parameters. Network operators decide what the values of the DRX parameters should be. Although software can be used to assist with this process, such software does not take into consideration information about the real-time needs of a particular UE that is connected to the network, such as information about the frequency at which a particular application is sending data packets to the UE.

The present disclosure enables an application that is sending data to a UE to directly adjust DRX parameters that control the UE's DRX behavior. In accordance with the present disclosure, DRX parameters can be adjusted via an application programming interface (API) that is exposed by a radio access network (RAN) controller that is communicatively coupled to a base station to which the UE is wirelessly connected. When an application wants to change one or more DRX parameters for a particular UE, the application can send a request to the RAN controller by making a function call to a relevant function that is exposed by the API. In response to receiving the request, the RAN controller can send one or more commands to the base station to which the UE is connected. The command(s) sent by the RAN controller can cause the base station to communicate new value(s) of DRX parameter(s) to the UE.

The techniques disclosed herein enable a plurality of different applications to adjust DRX parameters of a particular UE. This can be beneficial in many ways, but it also creates the possibility of conflicts occurring between different applications. To address this problem, the RAN controller can be configured to implement a conflict resolution policy that prevents such conflicts from occurring. When the RAN controller receives a request to change DRX parameter(s), the RAN controller can determine, based at least in part on the conflict resolution policy, whether the request should be granted.

FIG. 1 illustrates an example of a system 100 in which the techniques disclosed herein can be utilized. The system 100 includes a user equipment (UE) 102. The UE 102 can be any device that is used directly by an end user to access services via a mobile network 104. There are many different types of UEs that could be utilized in connection with the techniques disclosed herein. For example, the UE 102 could be a smartphone, a dedicated cellular telephone, a laptop computer, a tablet computer, a virtual reality (VR) device, an augmented reality (AR) device, a robot, a home appliance, a medical device, a car, a drone, an industrial machine, an agricultural machine, or the like. The UE 102 may alternatively be referred to as a mobile device, a mobile terminal, a mobile station, a wireless device, etc.

The UE 102 can wirelessly connect to a mobile network 104. A mobile network 104 includes a radio access network (RAN) 106 and a core network 108. The RAN 106 and the core network 108 function together to provide UEs 102 with access to services available from one or more external packet data networks. At least some services can be provided via the Internet 110.

The RAN 106 manages the radio spectrum, making sure it is used efficiently and meets users' quality-of-service (QoS) requirements. The RAN 106 includes a plurality of base stations (such as the base station 112 shown in FIG. 1) that communicate wirelessly with UEs (such as the UE 102 shown in FIG. 1) and enable them to wirelessly connect to the mobile network 104. The base station 112 can provide wireless connectivity for UEs within a particular geographic area, which can be referred to as a "cell." In 4G mobile networks, a base station is referred to as an evolved Node B (which is often shortened to "eNodeB" or "eNB"). In 5G mobile networks, a base station is referred to as a next generation Node B (which is often shortened to "gNodeB" or "gNB").

A RAN controller 114 can be configured to control various aspects of the RAN 106. The RAN controller 114 can be communicatively coupled to the base stations in the RAN 106, such as the base station 112 shown in FIG. 1. For example, the RAN controller 114 can be communicatively coupled to the base stations in the RAN 106 via the Internet 110. In some embodiments, the RAN controller 114 can be located on an edge server 176-1. The edge server 176-1 can be strategically deployed to reduce latency for the UE 102. In some embodiments, the RAN controller 114 can be implemented as the RAN Intelligent Controller (RIC) developed by the 0-RAN Alliance.

The core network 108 can perform a variety of functions, including providing Internet protocol (IP) connectivity for both data and voice services, ensuring this connectivity fulfills the promised QoS requirements, ensuring that the UEs are properly authenticated, tracking user mobility to ensure uninterrupted service, tracking subscriber usage for billing and charging, and so forth.

The core network 108 can include a control plane and a user plane. The delivery of services to UEs can occur via the user plane. Signaling that supports the establishment and maintenance of the user plane can occur via the control plane. In a 4G mobile network the core network 108 may be referred to as the Evolved Packet Core (EPC), and in a 5G mobile network it may be referred to as the Next Generation Core (NG-Core).

The UE 102 can receive data from one or more applications via the mobile network 104. For the sake of simplicity, a single application 116 is shown in FIG. 1. There are many different types of applications that can utilize the techniques disclosed herein. As one non-limiting example, the application can be a virtual reality (VR) and/or augmented reality (AR) application, and the UE 102 can be a VR/AR headset. As another non-limiting example, the application can be a videoconferencing application, and the UE 102 can be a type of computing device that includes a camera and a display (e.g., a smartphone, a laptop computer, a tablet computer) for video conferencing. Those skilled in the art will recognize many other types of applications that can be used in accordance with the present disclosure.

The UE 102 can include a transmitter 118 and a receiver 120 to allow transmission and reception of signals to and from base stations (such as the base station 112 shown in FIG. 1) via one or more antennas 122. The transmitter 118 and receiver 120 may be collectively referred to as a transceiver 124.

The UE 102 can be configured to implement discontinuous reception (DRX) techniques in which the receiver 120 is turned off during periods of inactivity. The UE 102 can include DRX parameters 126 that control the DRX behavior of the UE 102. The techniques disclosed herein enable an application 116 that is sending data to a UE 102 via a mobile network 104 to directly adjust the DRX behavior of the UE 102 by changing the DRX parameters 126.

In some embodiments, the DRX parameters 126 can be selected so that the DRX behavior of the UE 102 is determined based on how frequently data is being sent to the UE 102. For example, if the application 116 is sending data to the UE 102 at a particular packet interval (e.g., one data packet every N milliseconds), the DRX parameters 126 for the UE 102 can be selected so that the receiver 120 of the UE 102 is turned on whenever a new data packet is expected to arrive (e.g., the receiver 120 is turned on every N milliseconds). This prevents the UE 102 from unnecessarily turning on the receiver 120 and thereby increases the energy savings experienced by the UE 102.

The DRX parameters 126 of the UE 102 can be adjusted via an application programming interface (API) that is exposed by the RAN controller 114. This API may be referred to herein as a DRX API 128. The DRX API 128 can include a plurality of functions 130 that can be called to change the DRX parameters 126 used by the UE 102.

When an application 116 wants to change one or more DRX parameters 126 for the UE 102, the application 116 can send a request to the RAN controller 114 by making a function call to a relevant function 130 that is exposed by the DRX API 128. In response to receiving the request, the RAN controller 114 can send one or more commands to the base station 112. The command(s) sent by the RAN controller 114 can cause the base station 112 to communicate new value(s) of one or more DRX parameter(s) 126 to the UE 102.

Although just a single application 116 is shown in FIG. 1, the techniques disclosed herein enable a plurality of different applications to adjust the DRX parameters 126 of the UE 102. This creates the possibility of conflicts occurring between different applications. For example, if a particular application (e.g., the application 116 shown in FIG. 1) adjusts the DRX parameters 126 of the UE 102 to increase the amount of time that the receiver 120 is turned off, this could negatively affect the latency of another application that is also sending data to the UE 102.

To address this problem, the RAN controller 114 can be configured to implement a conflict resolution policy 132 that prevents such conflicts from occurring. The conflict resolution policy 132 can control when requests to change the DRX parameters 126 should be granted. When the RAN controller 114 receives a request to change one or more DRX parameters 126, the RAN controller 114 can determine, based at least in part on the conflict resolution policy 132, whether the request should be granted. If the conflict resolution policy 132 indicates that the request should be granted, then the RAN controller 114 can proceed to send command(s) to the base station 112 that cause the base station 112 to communicate new value(s) of one or more DRX parameters 126 to the UE 102. However, if the conflict resolution policy 132 indicates that the request should not be granted, then the RAN controller 114 can send a response to the requesting application 116 indicating that the request has been denied.

In some embodiments, the application 116 can be located on an edge server 176-2. The edge server 176-2 can be strategically deployed to reduce latency for the UE 102. The edge servers 176-1, 176-2 shown in FIG. 1 can be located at an edge location that is in relatively close proximity to the UE 102. In some embodiments, the edge servers 176-1, 176-2 can be located outside of a traditional data center. In the depicted embodiment, the RAN controller 114 is shown on a first edge server 176-1, and the application 116 is shown on a second edge server 176-2. In some embodiments, the first edge server 176-1 and the second edge server 176-2 could be separate edge servers. In alternative embodiments, however, both the RAN controller 114 and the application 116 could run on the same edge server.

Figure 2:
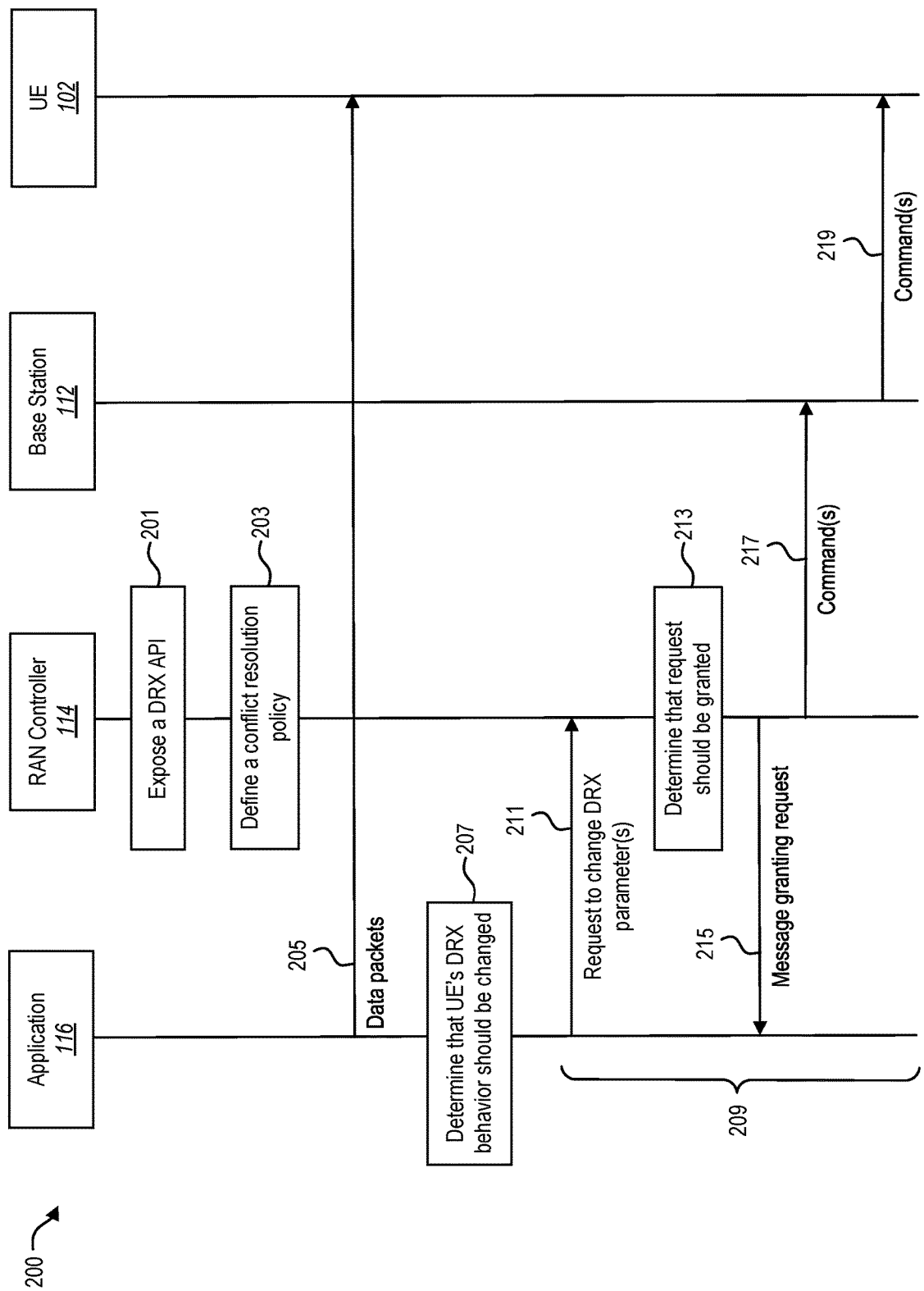
FIG. 2 illustrates an example of a method for adjusting DRX behavior of a UE to conserve energy use.

FIG. 2 illustrates an example of a method 200 for adjusting DRX behavior of a UE 102 to conserve energy use. The method 200 will be described in relation to the system 100 shown in FIG. 1. The entities that are involved in performing the method 200 include the application 116, the RAN controller 114, the base station 112, and the UE 102.

In act 201 of the method 200, the RAN controller 114 exposes a DRX API 128. As indicated above, the DRX API 128 can include a plurality of functions 130 that can be called to change the DRX parameters 126 used by the UE 102.

In act 203 of the method 200, the RAN controller 114 defines a conflict resolution policy 132. As indicated above, the conflict resolution policy 132 controls when requests to change the DRX parameters 126 should be granted. The conflict resolution policy 132 is designed to prevent conflicts between different applications.

In act 205 of the method 200, the application 116 sends data packets to the UE 102. The data packets can be sent at a particular packet interval. For example, a new data packet can be sent once every N milliseconds.

In act 207 of the method 200, the application 116 determines, based at least in part on the packet interval, that the DRX behavior of the UE 102 should be changed. For example, if the application 116 is sending a new data packet to the UE 102 once every N milliseconds, then the application 116 might want to change the DRX behavior of the UE 102 so that the UE 102 turns its receiver 120 on every N milliseconds to receive a new data packet and otherwise keeps its receiver 120 turned off.

In act 209 of the method 200, the application 116 causes one or more DRX parameters 126 of the UE 102 to be changed via the DRX API 128. Act 209 includes acts 211 through 219.

In act 211 of the method 200, the application 116 sends a request to the RAN controller 114 to change one or more DRX parameters 126 for the UE 102. Sending the request to the RAN controller 114 can include making a function call to a function 130 that is exposed by the DRX API 128. The application 116 can provide, as part of the function call, information that enables the UE 102 whose DRX parameter(s) 126 should be changed to be identified. Such information may be referred to herein as UE identifying information. The application 116 can also provide, as part of the function call, information that enables new value(s) for the DRX parameter(s) 126 to be determined. Such information may be referred to herein as parameter identifying information.

In some embodiments, the parameter identifying information can include one or more new values for one or more DRX parameters 126. Alternatively, in other embodiments, the parameter identifying information can include an indication of the packet interval at which new data packets are being sent from the application 116 to the UE 102. In such embodiments, the RAN controller 114 can calculate the new value(s) for the DRX parameter(s) 126 based on the packet interval.

In act 213 of the method 200, the RAN controller 114 determines, based at least in part on the conflict resolution policy 132, whether the request from the application 116 should be granted. If the RAN controller 114 determines that the request should not be granted, the RAN controller 114 can send a response to the application 116 indicating that the request is denied. However, in the present example, it will be assumed that the RAN controller 114 determines that the request should be granted. Therefore, in act 215 of the method 200, the RAN controller 114 sends a response to the application 116 indicating that the request is granted.

In act 217 of the method 200, the RAN controller 114 sends one or more commands to the base station 112. The command(s) cause the base station 112 to communicate new value(s) of one or more DRX parameter(s) 126 to the UE 102.

In act 219 of the method 200, the base station 112 sends one or more commands to the UE 102. The command(s) cause the UE 102 to change one or more of the DRX parameters 126 for the UE 102.

Figure 3:
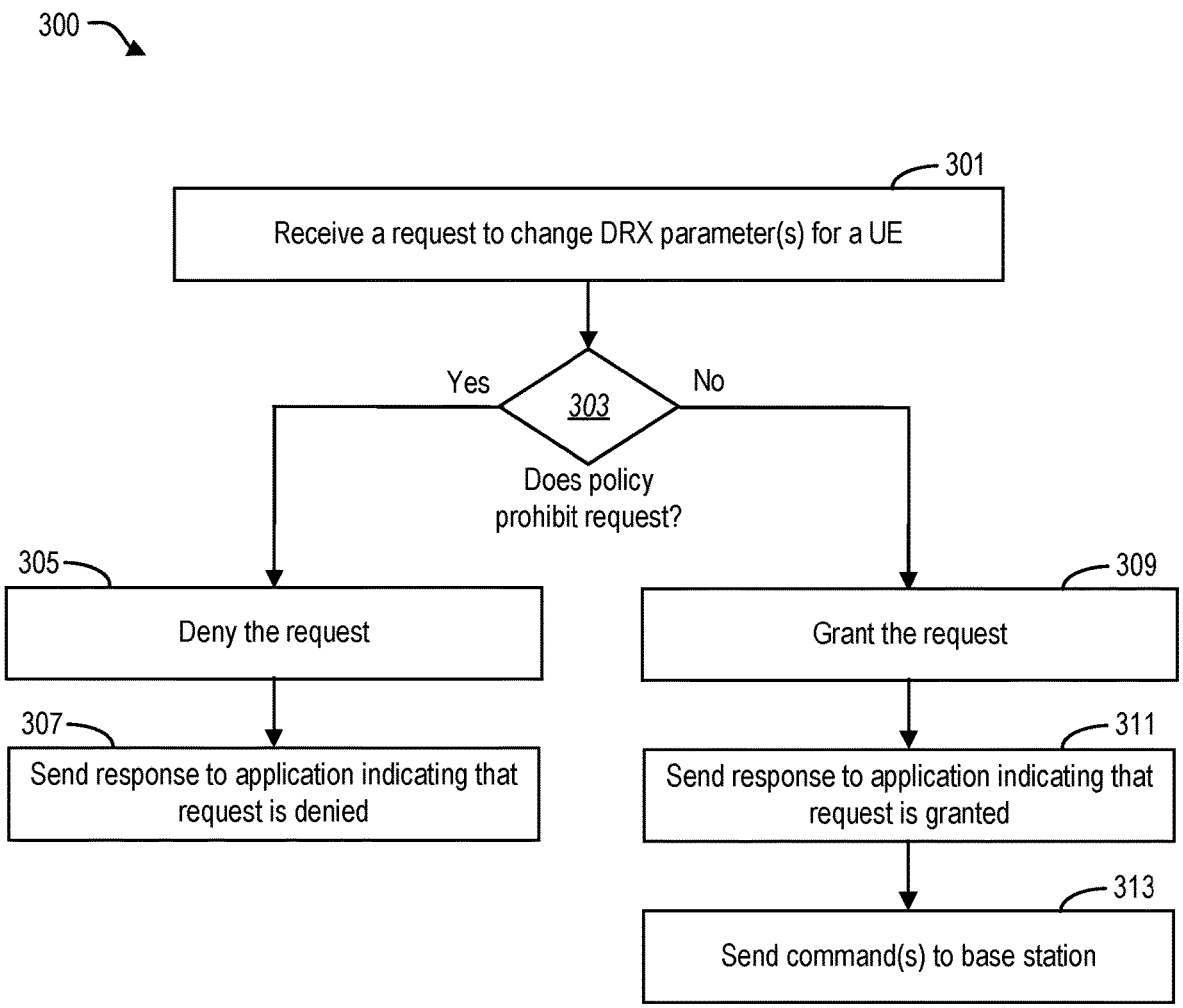
FIG. 3 illustrates an example of a method that can be performed by a RAN controller for adjusting DRX behavior of a UE to conserve energy use.

FIG. 3 illustrates an example of a method 300 that can be performed by a RAN controller 114 for adjusting DRX behavior of a UE 102 to conserve energy use. The method 300 will be described in relation to the system 100 shown in FIG. 1.

In act 301 of the method 300, the RAN controller 114 can receive a request to change one or more DRX parameters 126 for a UE 102. The request can be received from an application 116 that is sending data to the UE 102 via a mobile network 104.

In act 303 of the method 300, the RAN controller 114 can determine whether the conflict resolution policy 132 prohibits the request. For example, the RAN controller 114 can determine whether granting the request would cause a conflict with another application 116.

If the RAN controller 114 determines that the conflict resolution policy 132 prohibits the request, then in act 305 of the method 300 the RAN controller 114 can deny the request. In act 307 of the method 300 the RAN controller 114 can send a message to the application 116 indicating that the request has been denied.

If in act 303 the RAN controller 114 determines that the conflict resolution policy 132 does not prohibit the request, then in act 309 of the method 300 the core application 116 can grant the request. In act 311 of the method 300 the RAN controller 114 can send a message to the application 116 indicating that the request has been granted. In act 313 of the method 300, the RAN controller 114 can send one or more commands to the base station 112. The command(s) can cause the base station 112 to communicate new value(s) of the DRX parameter(s) 126 to the UE 102.

Figure 4:
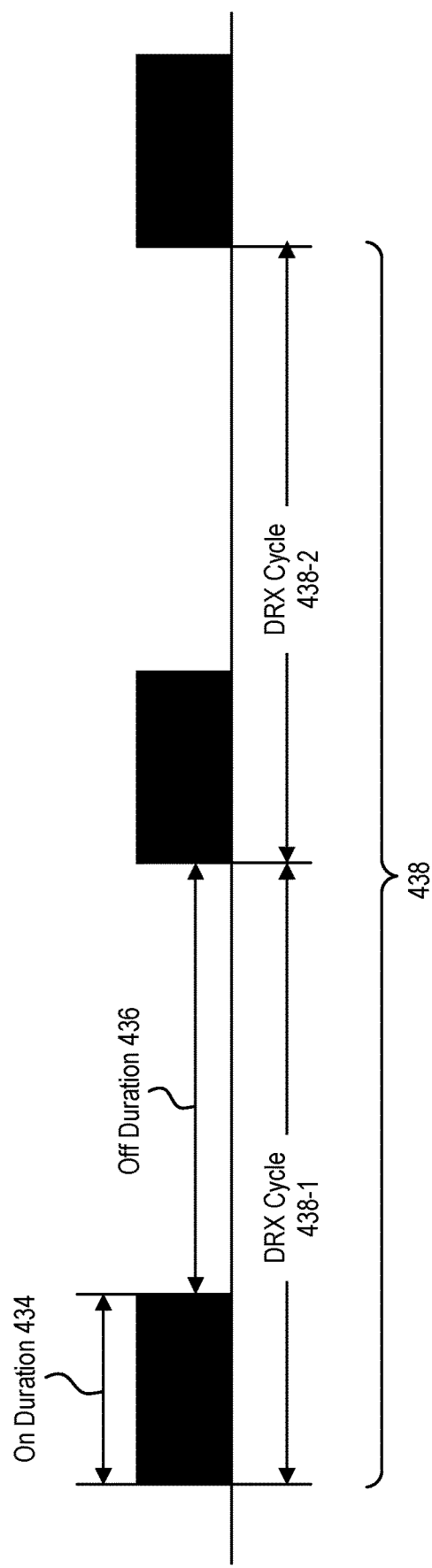
FIG. 4 illustrates an example showing possible DRX behavior of a UE.

FIG. 4 illustrates an example showing possible DRX behavior of a UE. When a UE implements DRX, the UE can be configured to turn its receiver circuitry on for a first time period and then turn its receiver circuitry off for a second time period. The first time period, during which the UE's receiver circuitry is turned on, may be referred to as the on duration 434. The second time period, during which the UE's receiver circuitry is turned off, may be referred to as the off duration 436. A DRX cycle 438 can include an on duration 434 followed by an off duration 436. The DRX behavior of a UE can include a plurality of successive DRX cycles 438. In the example shown in FIG. 4, a first DRX cycle 438-1 is followed by a second DRX cycle 438-2.

Referring to both FIG. 1 and FIG. 4, an application 116 can send data to a UE 102 at a particular packet interval (e.g., one data packet every N milliseconds). Under some circumstances, the packet interval at which data is sent to the UE 102 might not be aligned with the DRX cycle 438 that the UE 102 is implementing. For example, an application 116 can send a new data packet to a UE 102 once every N milliseconds, but the amount of time between successive DRX cycles 438 could be M milliseconds (where N #M). The techniques disclosed herein enable an application 116 to adjust DRX parameters of a UE 102 so that the DRX behavior of the UE 102 is based on the packet interval at which data is sent to the UE 102. For instance, in the present example an application 116 could adjust DRX parameters of the UE 102 so that the amount of time between successive DRX cycles 438 is N milliseconds (to match the packet interval).

Figure 5A:
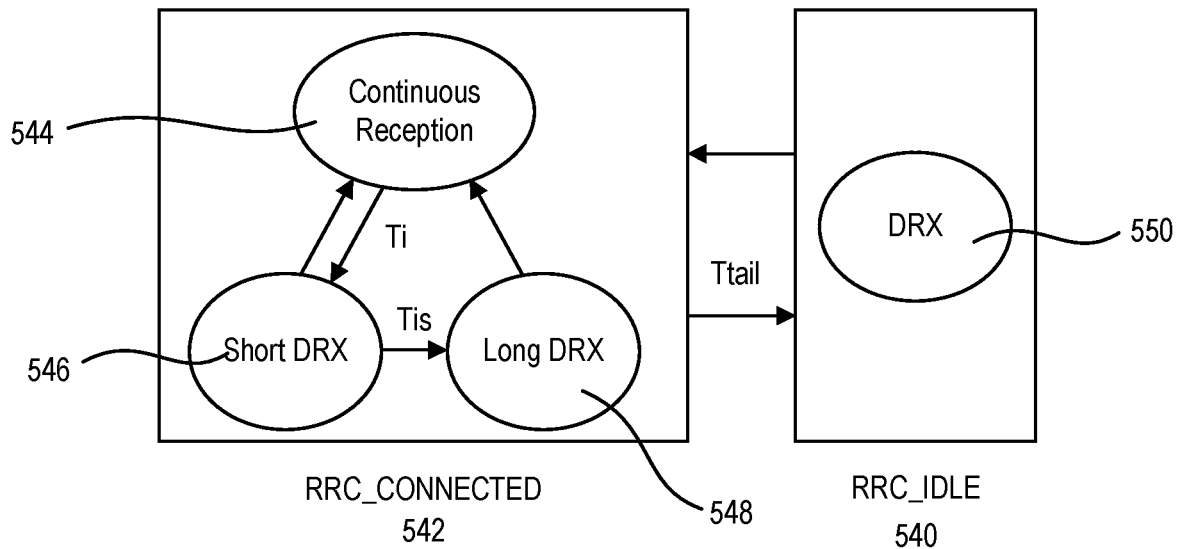
FIGS. 5A and 5B illustrate another example showing possible DRX behavior of a UE.
Figure 5B:
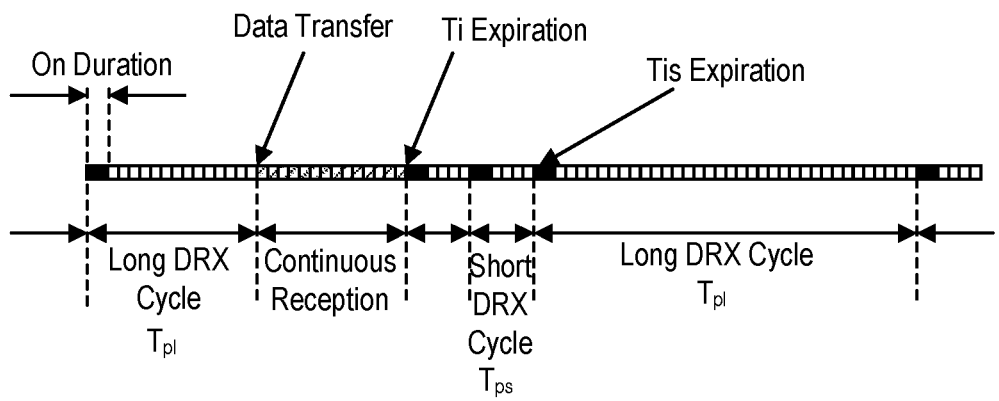

FIGS. 5A and 5B illustrate another example showing possible DRX behavior of a UE. The example shown in FIGS. 5A and 5B corresponds to the DRX behavior of a UE in an LTE system.

FIG. 5A is a state diagram showing radio resource control (RRC) modes for a UE in an LTE system. There are two RRC modes: the RRC_IDLE mode 540 and the RRC_CONNECTED mode 542. UEs in the RRC_IDLE mode 540 show sporadic activity that mainly involves cell selection and reselection. UEs in the RRC_CONNECTED mode 542 have allocated radio resources in shared data channels, specified by dedicated signaling performed via control channels.

In the RRC_CONNECTED mode 542, there are three possible states: a continuous reception state 544, a short DRX state 546, and a long DRX state 548. In the RRC_IDLE mode 550, there is one possible state: a DRX state 550.

In the continuous reception state 544 of the RRC_CONNECTED mode 542, the receiver circuitry is always turned on. In the short DRX state 546 and the long DRX state 548 of the RRC_CONNECTED mode 542, as well as the DRX state 550 of the RRC_IDLE mode 540, the UE goes through a DRX cycle (such as the DRX cycle 438 shown in FIG. 4) in which the receiver circuitry is turned on for a relatively brief period of time and then turned off. A DRX cycle in the short DRX state 546 may be referred to as a short DRX cycle, and a DRX cycle in the long DRX state 548 may be referred to as a long DRX cycle. The amount of time between successive long DRX cycles is greater than the amount of time between successive short DRX cycles. In other words, the UE turns its receiver circuitry on more frequently in the short DRX state 546 than in the long DRX state 548. Similarly, the amount of time between successive DRX cycles in the DRX state 550 is greater than the amount of time between successive long DRX cycles in the long DRX state 548.

If a UE is in the continuous reception state 544 and a timer (shown as $T_i$ in FIG. 5A) expires, then the UE transitions to the short DRX state 546. If a UE is in the short DRX state 546 and another timer (shown as $T_{is}$ in FIG. 5A) expires, then the UE transitions to the long DRX state 548. If a UE is in the long DRX state 548 and another timer (shown as $T_{tail}$ in FIG. 5A) expires, then the UE transitions to the DRX state 550 in the RRC_IDLE mode 540. Whenever data is received, the UE transitions into the continuous reception state 544.

Various parameters that can affect DRX behavior in an LTE system are included in Table 1, which is provided immediately below.

TABLE 1

| Symbol | Full Name | Description |
| --- | --- | --- |
| $T_i$ | DRX inactivity timer | UE stays in continuous reception for $T_i$ before DRX starts when idling |
| $T_{is}$ | Short DRX cycle timer | UE remains in short DRX for $T_{is}$ before entering long DRX when idling |
| $T_{tail}$ | RRC inactivity timer | UE stays in RRC_CONNECTED for $T_{tail}$ before demoting to RRC_IDLE |
| $T_{on}$ | RRC_CONNECTED on duration timer | The on duration of UE during each DRz cycle in RRC_CONNECTED |
| $T_{oni}$ | RRC_IDLE on duration timer | The on duration of UE during each DRX cycle in RRC_IDLE |
| $T_{ps}$ | Short DRX cycle | The cycle period of short DRX in RRC_CONNECTED |
| $T_{pl}$ | Long DRX cycle | The cycle period of long DRX in RRC_CONNECTED |
| $T_{pi}$ | RRC_IDLE DRX cycle | The cycle period of DRX in RRC_IDLE |

FIG. 5B illustrates an example of UE DRX behavior in the RRC_CONNECTED mode 542. Several of the parameters that are included in Table 1 are also illustrated in FIG. 5B.

The techniques disclosed herein can be utilized to change any of the parameters listed in Table 1. Referring to FIG. 1 in connection with FIGS. 5A-B and Table 1, in some embodiments the DRX API 128 can expose a separate function 130 for each of the DRX parameters 126 listed in Table 1. When an application 116 wants to change one of the DRX parameters 126, the application 116 can make a function call to the relevant function 130. In some embodiments, one or more of the functions 130 exposed by the DRX API 128 can be used to change more than one DRX parameter.

Although the example shown in FIGS. 5A-B corresponds to the DRX behavior of a UE in an LTE system, this should not be interpreted as limiting the scope of the present disclosure. The techniques disclosed herein can, of course, be applied to other types of wireless communication systems. For example, the techniques disclosed herein can be applied to change DRX parameters in a 5G system.

DRX behavior in a 5G system is similar in many respects to DRX behavior in an LTE system. When a UE is not receiving or sending data transmissions, the UE can stay in a low-power mode state known as "deep sleep." When data arrives, the UE can enter the connected mode for data transmission. Connected mode DRX provides two levels of monitoring granularity via short and long DRX configurations. Customizing control channel monitoring patterns allows a UE to stay in an intermediate low-power state ("micro sleep") part of the time without any performance loss. The techniques disclosed herein can be utilized to change any parameters that affect DRX behavior in a 5G system.

Figure 6:
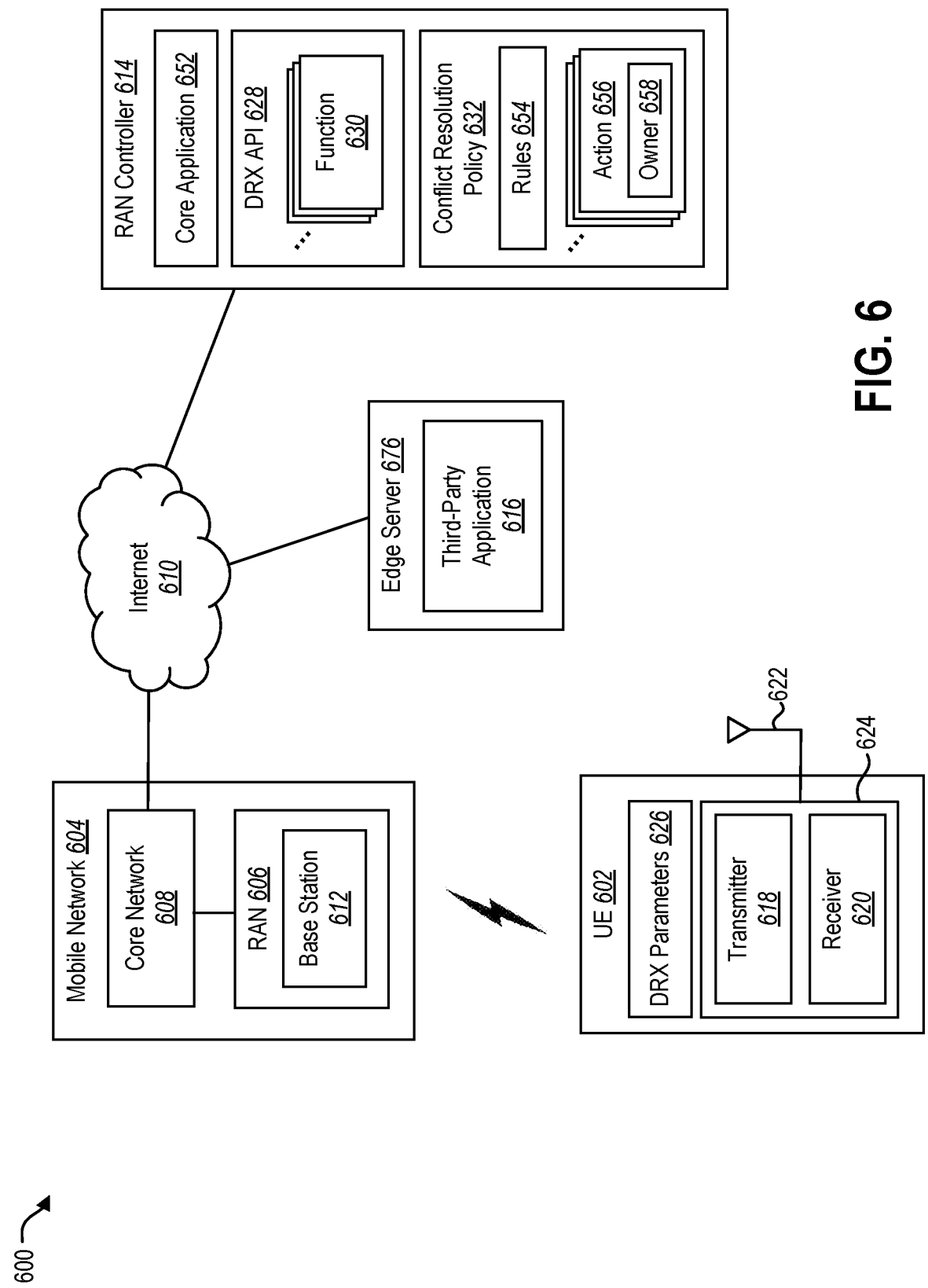
FIG. 6 illustrates another example of a system in which the techniques disclosed herein can be utilized.

FIG. 6 illustrates another example of a system 600 in which the techniques disclosed herein can be utilized. The system 600 shown in FIG. 6 is similar in many respects to the system 100 that was described above in connection with FIG. 1. The system 600 includes a UE 602 that can wireless connect to a mobile network 604. The mobile network 604 includes a RAN 606 and a core network 608, which provide UEs 602 with access to services available from one or more external packet data networks, such as the Internet 610.

The UE 602 can include a transmitter 618 and a receiver 620 to allow transmission and reception of signals to and from base stations (such as the base station 612 shown in FIG. 6) via one or more antennas 622. The transmitter 618 and receiver 620 may be collectively referred to as a transceiver 624.

The system 600 shown in FIG. 6 includes two different types of applications: a core application 652 and a third-party application 616. The core application 652 is provided as part of the RAN controller 614 and is expected to be used for the general optimization of the RAN 606. For example, the core application 652 can be used for the general optimization of all UEs 602 that are wirelessly connected to a base station 612 within the RAN 606. The core application 652 can be a trusted system application that has full visibility to the state of the RAN 606. Conversely, the third-party application 616 may not be trusted and may not have visibility to the state of the RAN 606, unless the third-party application 616 is explicitly granted permission to particular state information. The core application 652 can grant such permission to the third-party application 616.

The third-party application 616 can function similarly to the application 116 that was described above in connection with FIG. 1. In particular, the third-party application 616 can send data to the UE 602 via the mobile network 604. Under some circumstances, the third-party application 616 may want to change one or more DRX parameters 626 for the UE 602. When the third-party application 616 wants to change one or more DRX parameters 626 for the UE 602, the third-party application 616 can send a request to the RAN controller 614 by making a function call to a relevant function 630 that is exposed by the DRX API 628. When the RAN controller 614 receives a request to change DRX parameter(s) 626, the RAN controller 614 can determine, based at least in part on the conflict resolution policy 632, whether the request should be granted. In the depicted example, the core application 652 within the RAN controller 614 can be responsible for making this determination.

The core application 652 can determine whether a request to change DRX parameter(s) 626 for a UE 602 should be granted based on one or more rules 654 that are defined as part of the conflict resolution policy 632. In some embodiments, a plurality of actions 656 can be defined. An action 656 can represent modifying DRX parameters 626 associated with a particular UE 602 that is connected to the RAN 606. Each action 656 can have an owner 658. In some embodiments, the conflict resolution policy 632 can be designed to permit only a single owner 658 for each action 656. The rules 654 for granting or denying requests to change DRX parameters 626 can be based at least in part on ownership of the actions 656.

In some embodiments, the core application 652 can grant a request to change DRX parameter(s) 626 for a UE 602 as long as another third-party application 616 does not own the relevant action 656. More specifically, the request to change DRX parameter(s) 626 can correspond to a particular action 656. If the core application 652 itself is the owner 658 of the action 656, then the request can be granted. However, if another third-party application 616 is the owner 658 of the action 656, then the request can be denied.

In some embodiments, the core application 652 can also take other factors into consideration (e.g., the effect of granting the request on overall network performance) when deciding whether to grant a request to change DRX parameter(s) 626 for a UE 602. For example, if the third-party application 616 sends a request to change DRX parameter(s) 626 for a UE 602 and another third-party application 616 does not own the corresponding action 656, the core application 652 could still deny the request if the core application 652 determines that granting the request would adversely affect overall network performance.

For the sake of simplicity, only a single core application 652 and a single third-party application 616 are shown in the system 600 depicted in FIG. 6. However, a RAN controller in accordance with the present disclosure could include a plurality of different core applications. In addition, the RAN controller could enable a plurality of different third-party applications to change DRX parameters for a plurality of different UEs.

In some embodiments, the third-party application 616 can run on an edge server 676, as shown in FIG. 6.

Figure 7:
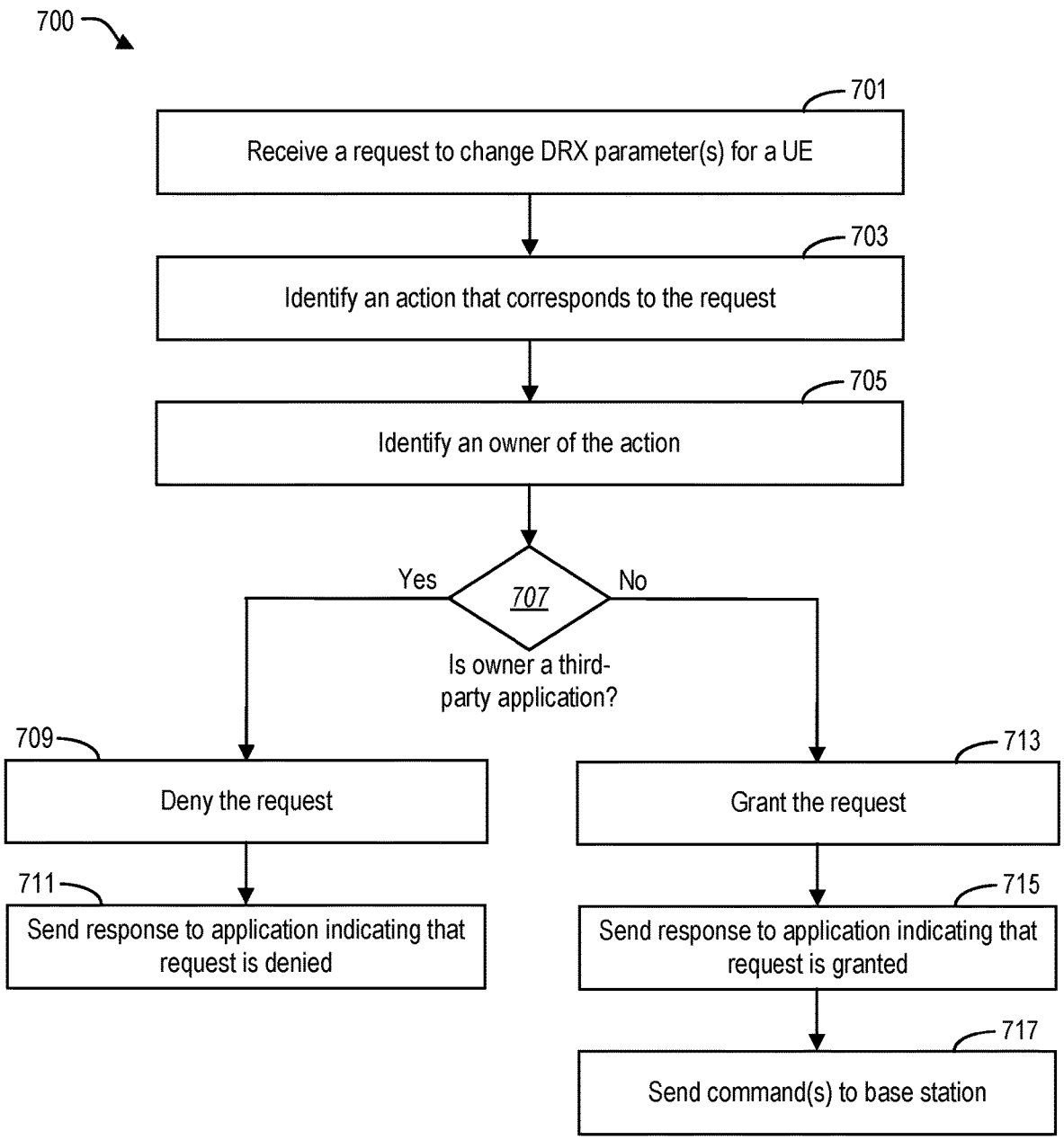
FIG. 7 illustrates an example of a method that can be performed by a RAN controller in order to determine whether a request to change DRX parameter(s) for a UE should be granted.

FIG. 7 illustrates an example of a method 700 that can be performed by a RAN controller 614 in order to determine whether a request to change DRX parameter(s) 626 for a UE 602 should be granted. The method 700 will be described in relation to the system 600 shown in FIG. 6. At least some actions of the method 700 can be performed by a core application 652 in the RAN controller 614.

In act 701 of the method 700, the RAN controller 614 can receive a request to change one or more DRX parameters 626 for a UE 602. The request can be received from a third-party application 616. To distinguish the third-party application 616 that sends the request from other third-party applications, the third-party application 616 that sends the request may be referred to as a requesting third-party application 616. As discussed above, receiving the request can include receiving a function call to a function 630 that is exposed by the DRX API 628.

In act 703 of the method 700, the core application 652 in the RAN controller 614 can identify an action 656 that corresponds to the request received in act 701.

In act 705 of the method 700, the core application 652 can identify an owner 658 of the action 656 that is identified in act 703.

In act 707 of the method 700, the core application 652 can determine whether the owner 658 of the action 656 is a third-party application 616.

If in act 707 of the method 700 the core application 652 determines that the owner 658 of the action 656 is a third-party application 616, then in act 709 of the method 700 the core application 652 can deny the request. In act 711 of the method 700 the RAN controller 614 can send a message to the requesting third-party application 616 indicating that the request has been denied.

If in act 707 of the method 700 the core application 652 determines that the owner 658 of the action 656 is not a third-party application 616, then in act 713 of the method 700 the core application 652 can grant the request. In act 715 of the method 700 the RAN controller 614 can send a message to the requesting third-party application 616 indicating that the request has been granted. In act 717 of the method 700 the RAN controller 614 can send one or more commands to the base station 612 to which the UE 602 is connected. The command(s) sent by the RAN controller 614 can cause the base station 612 to communicate new value(s) of DRX parameter(s) 626 to the UE 602.

Figure 8A:
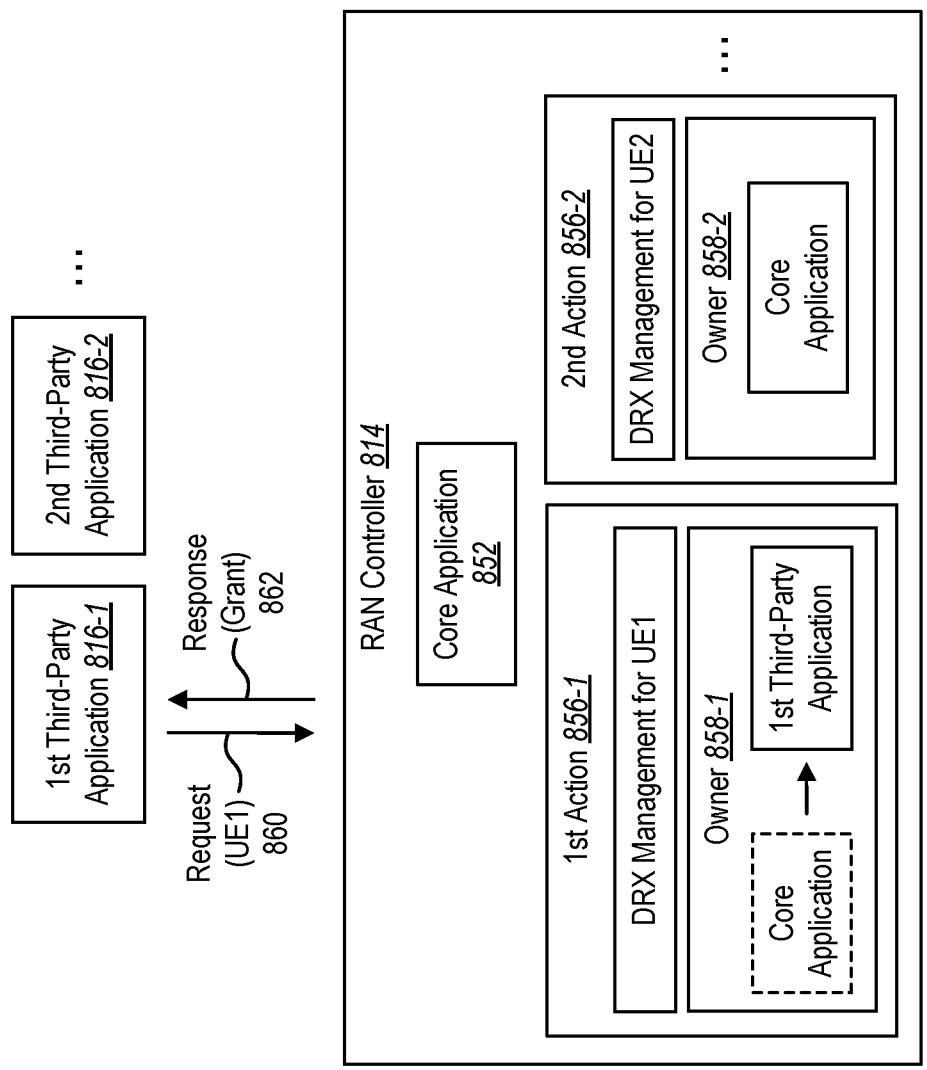
FIGS. 8A-C illustrate an example showing how a core application in a RAN controller can decide whether to grant or deny requests from third-party applications.
Figure 8B:
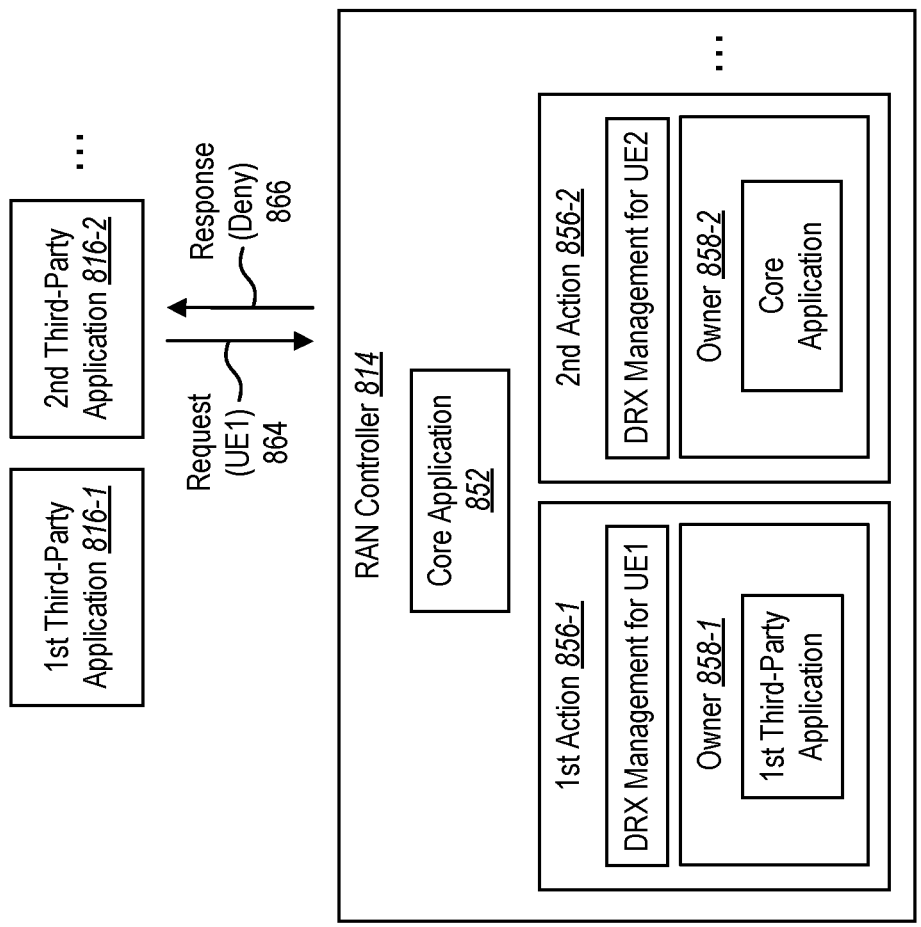
Figure 8C:
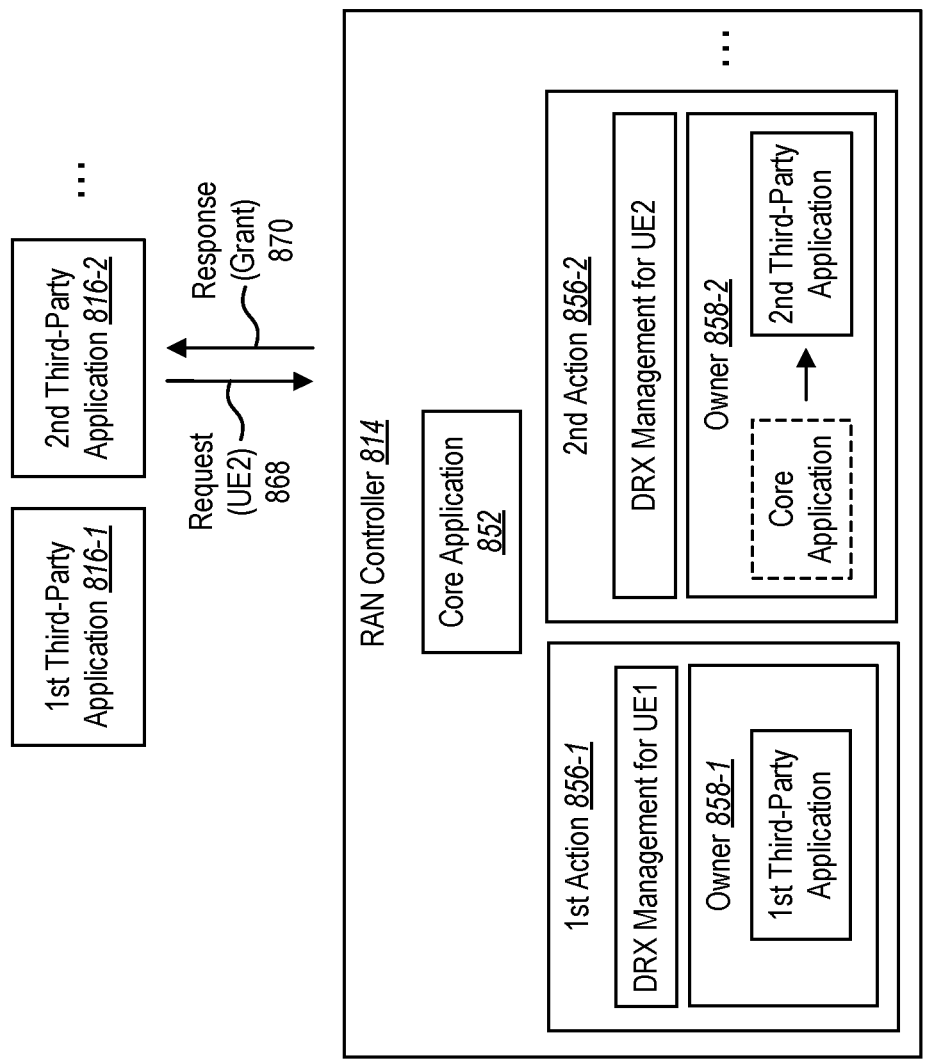

FIGS. 8A-C illustrate an example showing how a core application 852 in a RAN controller 814 can decide whether to grant or deny requests from third-party applications. The depicted example involves two third-party applications: a first third-party application 816-1 and a second third-party application 816-2. Two actions have been defined: a first action 856-1 that represents modifying DRX parameters 826 associated with a first UE (UE1), and a second action 856-2 that represents modifying DRX parameters associated with a second UE (UE2).

Reference is initially made to FIG. 8A. For purposes of the present example, it will be assumed that both the first action 856-1 and the second action 856-2 are initially owned by the core application 852. In other words, the core application 852 is initially the owner of actions (the first action 856-1 and the second action 856-2) that the first third-party application 816-1 and the second third-party application 816-2 could potentially want to use, as will be discussed in greater detail below.

The core application 852 receives a request 860 from the first third-party application 816-1 to modify one or more DRX parameters for UE1. In response to receiving this request 860, the core application 852 identifies an action that corresponds to the received request 860. In this case, the first action 856-1 corresponds to the received request 860. The core application 852 also determines whether the owner 858-1 of the first action 856-1 is another third-party application. In this case, the first action 856-1 is presently owned by the core application 852, not another third-party application. Therefore, the core application 852 grants the request 860 and sends a response 862 to the first third-party application 816-1 indicating that the request 860 has been granted. The core application 852 also changes the owner 858-1 of the first action 856-1 to the first third-party application 816-1. After granting the request 860, the RAN controller 814 can send one or more commands to the base station to which UE1 is connected, causing the base station to communicate new value(s) of DRX parameter(s) to UE1.

Referring now to FIG. 8B, the core application 852 receives a request 864 from the second third-party application 816-2 to modify one or more DRX parameters for UE1. In response to receiving this request 864, the core application 852 identifies the first action 856-1 as corresponding to the received request 864. The core application 852 also determines whether the owner 858-1 of the first action 856-1 is another third-party application. In this case, the first action 856-1 is presently owned by another third-party application, namely the first third-party application 816-1. Therefore, the core application 852 denies the request 864 and sends a response 866 to the second third-party application 816-2 indicating that the request 864 has been denied.

Referring now to FIG. 8C, the core application 852 receives a request 868 from the second third-party application 816-2 to modify one or more DRX parameters for UE2. In response to receiving this request 868, the core application 852 identifies an action that corresponds to the received request 868. In this case, the second action 856-2 corresponds to the received request 868. The core application 852 also determines whether the owner 858-2 of the second action 856-2 is another third-party application. In this case, the second action 856-2 is presently owned by the core application 852, not another third-party application. Therefore, the core application 852 grants the request 868 and sends a response 870 to the second third-party application 816-2 indicating that the request 868 has been granted. The core application 852 also changes the owner 858-2 of the second action 856-2 to the second third-party application 816-2.

Figure 9:
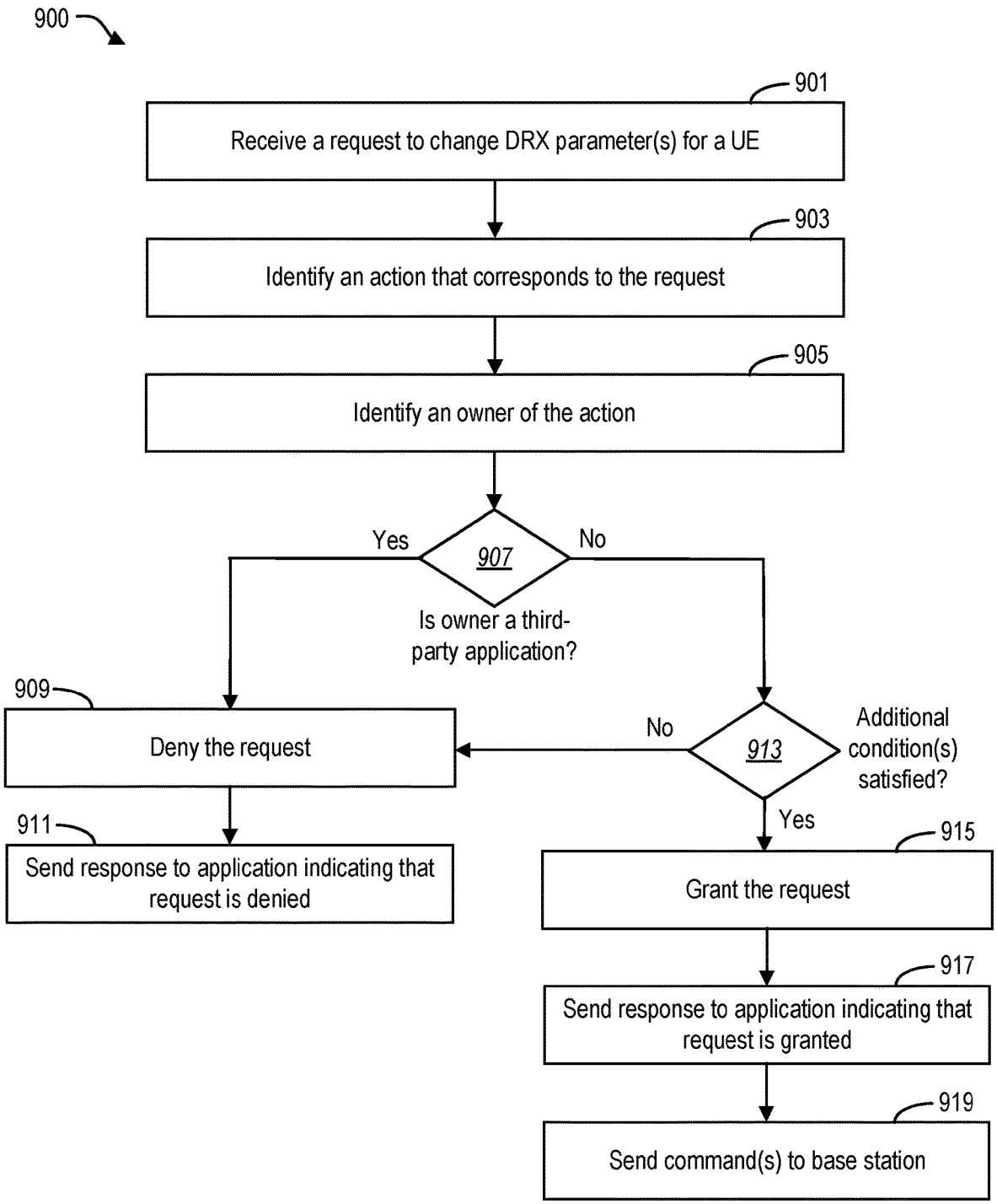
FIG. 9 illustrates another example of a method that can be performed by a RAN controller in order to determine whether a request to change DRX parameter(s) for a UE should be granted.

FIG. 9 illustrates another example of a method 900 that can be performed by a RAN controller 614 in order to determine whether a request to change DRX parameter(s) 626 for a UE 602 should be granted. The method 900 will be described in relation to the system 600 shown in FIG. 6. At least some actions of the method 900 can be performed by a core application 652 in the RAN controller 614.

In the method 700 that was previously described in connection with FIG. 7, the core application 652 grants a request to change DRX parameter(s) 626 for a UE 602 as long as another third-party application 616 does not own the relevant action 656. However, in the method 900 shown in FIG. 9, in addition to determining ownership of the relevant action 656, the core application 652 can also take other factors into consideration (e.g., the effect of granting the request on overall network performance) when deciding whether to grant a request to change DRX parameter(s) 626 for a UE 602.

In act 901 of the method 900, the RAN controller 614 can receive a request to change one or more DRX parameters for a UE 602. The request can be received from a third-party application 616, which may be referred to as a requesting third-party application 616. As discussed above, receiving the request can include receiving a function call to a function 630 that is exposed by a DRX API 628.

In act 903 of the method 900, the core application 652 in the RAN controller 614 can identify an action 656 that corresponds to the request received in act 901.

In act 905 of the method 900, the core application 652 can identify an owner of the action 656 that is identified in act 903. In act 907 of the method 900, the core application 652 can determine whether the owner of the action 656 is a third-party application 616.

If in act 907 of the method 900 the core application 652 determines that the owner of the action 656 is a third-party application 616, then in act 909 of the method 900 the core application 652 can deny the request. In act 911 of the method 900 the RAN controller 614 can send a message to the requesting third-party application 616 indicating that the request has been denied.

If in act 907 of the method 900 the core application 652 determines that the owner of the action 656 is not a third-party application 616, then in act 913 of the method 900 the core application 652 can determine whether one or more additional conditions for granting the request are satisfied. For example, the core application 652 can determine whether granting the request would adversely affect network performance. In some embodiments, determining whether granting the request would adversely affect network performance can include estimating how granting the request would affect one or more metrics that indicate network performance, and then comparing the estimated metrics to one or more pre-defined thresholds.

If in act 913 of the method 900 the core application 652 determines that the additional condition(s) for granting the request are not satisfied, then the core application 652 can deny the request. The method 900 can then proceed to act 909 and continue as described above.

If in act 913 of the method 900 the core application 652 determines that the additional condition(s) for granting the request are satisfied, then in act 915 of the method 900 the core application 652 can grant the request. In act 917 of the method 900 the RAN controller 614 can send a message to the requesting third-party application 616 indicating that the request has been granted. In act 919 of the method 900 the RAN controller 614 can send one or more commands to the base station 612 to which the UE 602 is connected. The command(s) sent by the RAN controller 614 can cause the base station 612 to communicate new value(s) of DRX parameter(s) 626 to the UE 602.

Figure 10:
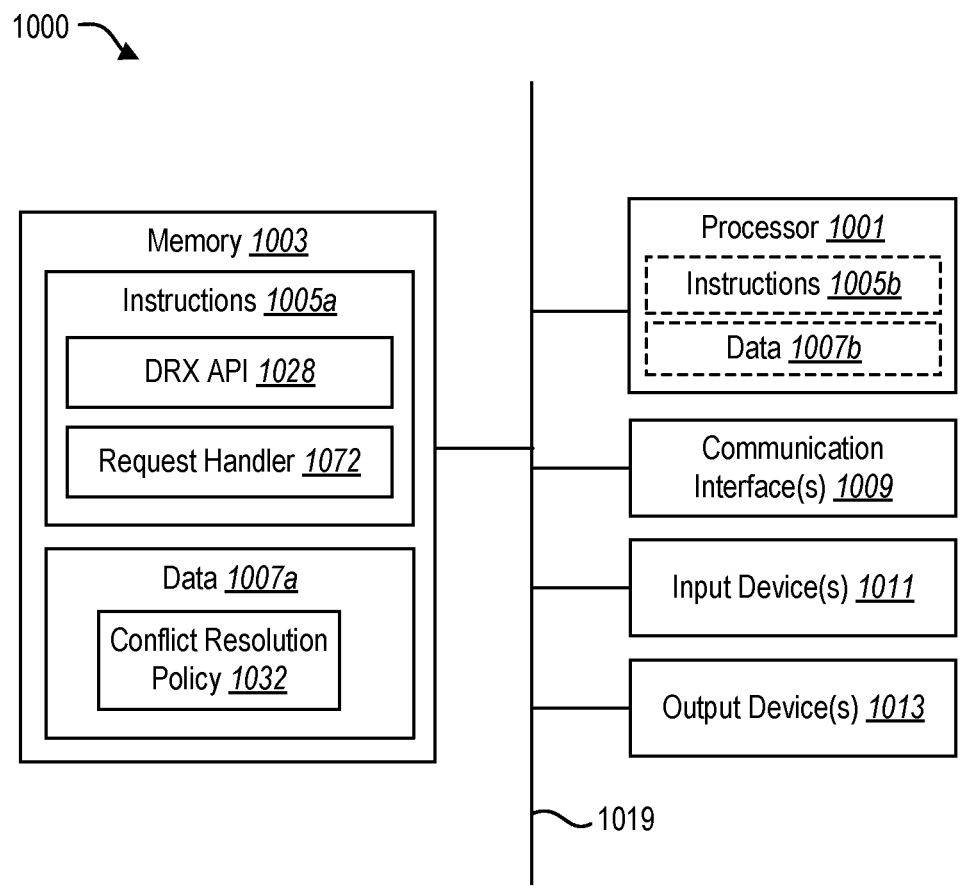
FIG. 10 illustrates certain components that can be included within a computing system that can be used to implement the actions and operations that have been described herein in connection with a RAN controller.

FIG. 10 illustrates certain components that can be included within a computing system 1000. The computing system 1000 can be used to implement the actions and operations that have been described herein in connection with a RAN controller (e.g., the RAN controller 114 in FIG. 1, the RAN controller 614 in FIG. 6). In some embodiments, a plurality of computing systems 1000 can collectively implement the actions and operations that have been described herein in connection with a RAN controller.

The computing system 1000 includes a processor 1001 and memory 1003 in electronic communication with the processor 1001. Instructions 1005a and data 1007a can be stored in the memory 1003. The instructions 1005a can be executable by the processor 1001 to implement some or all of the methods, steps, operations, actions, or other functionality disclosed herein related to a RAN controller. Executing the instructions 1005a can involve the use of the data 1007a that is stored in the memory 1003. When the processor 1001 executes the instructions 1005a, various instructions 1005b can be loaded onto the processor 1001, and various pieces of data 1007b can be loaded onto the processor 1001.

Unless otherwise specified, any of the various examples of modules and components described herein in connection with a RAN controller can be implemented, partially or wholly, as instructions 1005a stored in memory 1003 and executed by the processor 1001. Any of the various examples of data described herein in connection with a RAN controller can be among the data 1007a that is stored in memory 1003 and used during execution of the instructions 1005a by the processor 1001.

Although just a single processor 1001 and a single memory 1003 are shown in the computing system 1000 of FIG. 9, in an alternative configuration, a combination of processors and/or a combination of memory devices could be used.

The instructions 1005a in the memory 1003 can include one or more modules that can be executable by the processor 1001 to perform some or all aspects of the methods that have been described herein in connection with a RAN controller (e.g., the method 200 shown in FIG. 2, the method 300 shown in FIG. 3, the method 700 shown in FIG. 7, the method 900 shown in FIG. 9). Such modules can include a DRX API 1028 (and any functions or methods associated with the DRX API 1028) that is exposed by a RAN controller. Such modules can also include a request handler 1064 for handling requests to change DRX parameters. As discussed above, such requests can be received from applications via the DRX API 1028.

The data 1007a stored in the memory 1003 can include any of the various examples of data described herein in connection with a RAN controller. For example, the data 1007a stored in the memory 1003 can represent data that is stored, accessed, or otherwise used in connection with the methods that have been described herein in connection with a RAN controller (e.g., the method 200 shown in FIG. 2, the method 300 shown in FIG. 3, the method 700 shown in FIG. 7, the method 900 shown in FIG. 9).

For example, the data 1007a stored in the memory 1003 can include a conflict resolution policy 1032. The conflict resolution policy 1032 shown in FIG. 10 can represent any of the conflict resolution policies described herein in connection with a RAN controller (e.g., the conflict resolution policy 132 shown in FIG. 1, the conflict resolution policy 632 shown in FIG. 6).

The specific instructions 1005a and data 1007a shown in FIG. 10 are provided for purposes of example only and should not be interpreted as limiting the scope of the present disclosure. A computing system 1000 that implements any of the techniques disclosed herein can include other instructions 1005a and/or other data 1007a in addition to or instead of what is specifically shown in FIG. 10.

The computing system 1000 can also include various other components, including one or more communication interfaces 1009, one or more input devices 1011, and one or more output devices 1013.

The communication interface(s) 1009 can be configured to communicate with other computing systems and/or networking devices. This includes receiving data transmissions from other computing systems and/or networking devices, and also sending data transmissions to other computing systems and/or networking devices. The communication interface(s) 1009 can be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The various components of the computing system 1000 can be coupled together by one or more buses, which can include a power bus, a control signal bus, a status signal bus, a data bus, etc. For simplicity, the various buses are illustrated in FIG. 9 as a bus system 1019.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for adjusting discontinuous reception (DRX) behavior of a user equipment (UE), the UE being in wireless communication with a base station in a fifth generation (5G) mobile network, the method being performed by a radio access network (RAN) controller that is communicatively coupled to the base station, the method comprising:
   exposing a DRX application programming interface (API) that enables DRX parameters to be changed;
   creating a conflict resolution policy that controls when requests to change the DRX parameters should be granted, the conflict resolution policy being designed to prevent conflicts between different applications;
   receiving, via the DRX API, a first request from a first application to change a DRX parameter for the UE from a current value to a new value, wherein the first application is external to the UE and is configured to send data to the UE via the 5G mobile network that comprises the base station;
   determining, based at least in part on the conflict resolution policy, that the first request should be granted; and
   sending a command to the base station, the command causing the base station to communicate the new value of the DRX parameter to the UE.

2. The method of claim 1, wherein:
   the first application sends data packets to the UE at a packet interval; and
   changing the DRX parameter causes a duration of a DRX cycle for the UE to match the packet interval.

3. The method of claim 1, wherein receiving the first request from the first application comprises receiving a function call to a function that is exposed by the DRX API.

4. The method of claim 3, wherein the function call comprises the new value for the DRX parameter.

5. The method of claim 3, wherein:
   the first application sends data packets to the UE at a packet interval;
   the function call comprises the packet interval; and
   the method further comprises determining the new value for the DRX parameter based at least in part on the packet interval.

6. The method of claim 1, wherein:
   the conflict resolution policy defines a plurality of actions;
   each action among the plurality of actions represents modifying one or more of the DRX parameters associated with a particular UE;
   the conflict resolution policy permits only a single owner for each action among the plurality of actions; and
   determining that the first request should be granted is based at least in part on ownership of an action corresponding to the first request.

7. The method of claim 1, wherein the first request is received from a third-party application, and wherein determining that the first request should be granted comprises:
   identifying an action corresponding to the first request; and
   determining that the action is not owned by another third-party application.

8. The method of claim 7, wherein determining that the first request should be granted further comprises determining that at least one additional condition is satisfied, the at least one additional condition being unrelated to ownership of the action.

9. The method of claim 1, further comprising:
   receiving, via the DRX API, a second request from a second application to change the DRX parameter;
   determining, based at least in part on the conflict resolution policy, that the second request should not be granted; and
   sending a response to the second application indicating that the second request is denied.

10. The method of claim 9, wherein determining that the second request should not be granted comprises:
    identifying an action corresponding to the second request; and
    determining that the action is owned by the first application.

11. A method for adjusting discontinuous reception (DRX) behavior of a user equipment (UE), the UE being in wireless communication with a base station in a fifth generation (5G) mobile network, the method being performed by an application that is sending data to the UE via the 5G mobile network that comprises the base station, the method comprising:
    sending data packets to the UE at a packet interval;
    determining, based at least in part on the packet interval, that the DRX behavior of the UE should be changed; and
    causing a DRX parameter for the UE to be changed via a DRX application programming interface (API) exposed by a radio access network (RAN) controller that is communicatively coupled to the base station, wherein causing the DRX parameter to be changed comprises:
sending a request to the RAN controller to change the DRX parameter, the request being sent via the DRX API; and
providing the RAN controller, via the DRX API, with UE identifying information that enables the UE to be identified and parameter identifying information that enables a new value for the DRX parameter to be determined.

12. The method of claim 11, wherein:
sending the request to the RAN controller comprises making a function call to a function that is exposed by the DRX API; and
the function call comprises the UE identifying information and the parameter identifying information.

13. The method of claim 12, wherein the parameter identifying information comprises the new value for the DRX parameter.

14. The method of claim 12, wherein the parameter identifying information comprises the packet interval.

15. A system for adjusting discontinuous reception (DRX) behavior of a user equipment (UE), the UE being in wireless communication with a base station in a fifth generation (5G) mobile network, the system comprising:
one or more processors;
memory in electronic communication with the one or more processors; and
instructions stored in the memory, the instructions being executable by the one or more processors to:
expose a DRX application programming interface (API) that enables DRX parameters to be changed;
create a conflict resolution policy that controls when requests to change the DRX parameters should be granted, the conflict resolution policy being designed to prevent conflicts between different applications;
receive, via the DRX API, a first request from a first application to change a DRX parameter for the UE from a current value to a new value, wherein the first application is external to the UE and is configured to send data to the UE via the 5G mobile network that comprises the base station;
determine, based at least in part on the conflict resolution policy, that the first request should be granted; and
send a command to the base station, the command causing the base station to communicate the new value of the DRX parameter to the UE.

16. The system of claim 15, wherein:
the first application sends data packets to the UE at a packet interval; and
changing the DRX parameter causes a duration of a DRX cycle for the UE to match the packet interval.

17. The system of claim 15, wherein receiving the first request from the first application comprises receiving a function call to a function that is exposed by the DRX API.

18. The system of claim 17, wherein the function call comprises the new value for the DRX parameter.

19. The system of claim 17, wherein:
the first application sends data packets to the UE at a packet interval;
the function call comprises the packet interval; and
the system further comprises additional instructions stored in the memory, the additional instructions being executable by the one or more processors to determine the new value for the DRX parameter based at least in part on the packet interval.

20. The system of claim 15, wherein:
the conflict resolution policy defines a plurality of actions;
each action among the plurality of actions represents modifying one or more of the DRX parameters associated with a particular UE;
the conflict resolution policy permits only a single owner for each action among the plurality of actions; and
determining that the first request should be granted is based at least in part on ownership of an action corresponding to the first request.

* * * * *